(12) United States Patent
Peerlings

(10) Patent No.: US 7,110,098 B2
(45) Date of Patent: Sep. 19, 2006

(54) BIDIRECTIONAL OPTICAL LOSS MEASUREMENT

(75) Inventor: Joachim Peerlings, Ehningen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/778,958

(22) Filed: Feb. 13, 2004

(65) Prior Publication Data

US 2004/0218171 A1    Nov. 4, 2004

(30) Foreign Application Priority Data

Mar. 28, 2003  (EP)  ................... 03007083

(51) Int. Cl.
*G01N 21/00*  (2006.01)
(52) U.S. Cl. .................................... 356/73.1
(58) Field of Classification Search .............. 356/73.1; 385/12–14, 27–31; 250/227.11, 227.18; 398/9–38
See application file for complete search history.

(56) References Cited

U.S. PATENT DOCUMENTS

| 4,838,690 A | 6/1989 | Buckland et al. | .......... 356/73.1 |
| 5,187,362 A | 2/1993 | Keeble | ................... 250/227.15 |
| 6,381,010 B1 | 4/2002 | Piffaretti | .................... 356/73.1 |

FOREIGN PATENT DOCUMENTS

| DE | 0 926 479 A1 * | 6/1999 |
| JP | 56198531 | 12/1981 |
| JP | 57233661 | 12/1982 |

* cited by examiner

*Primary Examiner*—Tu T. Nguyen

(57) ABSTRACT

The present invention relates to an apparatus and to a method of measurement of optical loss of a DUT having a first end and a second end, comprising the steps of: coupling an optical signal into the first end of the DUT, measuring the optical power of the optical signal by a first detector, reflecting the optical signal at the second end of the DUT to send back a reflected optical signal into the DUT, measuring a reflected optical power of the reflected optical signal by a second detector, evaluating a two-way optical loss on the basis of measurements of the first and the second detectors.

11 Claims, 3 Drawing Sheets

BIDIRECTIONAL OPTICAL LOSS MEASUREMENT

BACKGROUND OF THE INVENTION

The present invention relates to measurement of optical loss of a device under test (DUT), e.g. an optical fiber.

SUMMARY OF THE INVENTION

It is an object of the invention to provide improved measurement of optical loss.

The object is solved by the independent claims.

An advantage of an embodiment of the present invention is the possibility of measuring the average optical loss from one side of the DUT. According to the prior art a standard way of measuring optical loss of a DUT is to use an optical light source, e.g. a laser, at one end of the DUT and an optical power meter at the other end of the DUT. However, optical loss has to be measured in two directions, e.g. the optical loss of a fiber link from A to B has to be measured in the direction from A to B and in the direction from B to A. The optical loss measured in both directions is then averaged. This known method, however, is not capable of measuring the average optical loss from one side of the DUT.

The current invention preferably uses an optical time domain reflectometer (OTDR) and a reflector at the end of the DUT to measure the two-way or bidirectional average optical loss of the DUT from one end of the DUT, only.

According to another preferred embodiment of the present invention the measurement of optical loss can also be done using an optical light source and an optical power meter replacing the OTDR. However, a result of such a measurement can be less accurate due to possible accumulated backscatter of the DUT, which is measured by the detector together with the reflected signal by the end reflex.

Other preferred embodiments of the invention are shown by the dependent claims.

The invention can be partly embodied or supported by one or more suitable software programs, which can be stored on or otherwise provided by any kind of data carrier, and which might be executed in or by any suitable data processing unit. Software programs or routines are preferably applied to the realization of the inventive method.

BRIEF DESCRIPTION OF THE DRAWINGS

Other objects and many of the attendant advantages of the present invention will be readily appreciated and become better understood by reference to the following detailed description when considering in connection with the accompanied drawings. The components in the drawings are not necessarily to scale, emphasis instead being placed upon clearly illustrating the principles of the present invention. Features that are substantially or functionally equal or similar will be referred to with the same reference sign(s).

DETAILED DESCRIPTION OF PREFERRED EMBODIMENTS OF THE INVENTION

Figure 1:
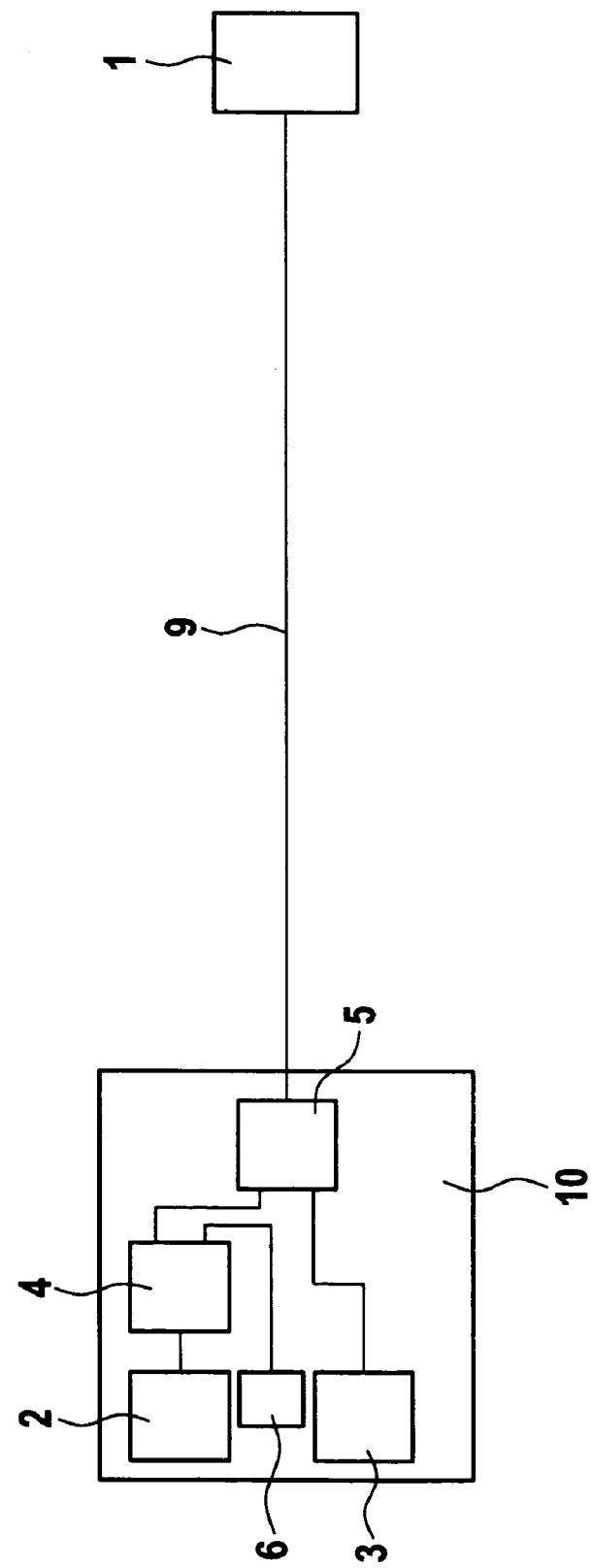
FIGS. 1, 2 and 3 show schematic illustrations of embodiments of the present invention.

Referring now in greater detail to the drawings, FIG. 1 shows how a pulse power P of light of a laser 2 acting as a light source of an OTDR 10 is measured through a coupler 4 by a detector 6 acting as a power meter for the power P of the laser 2. With this measurement the power P is known which is launched by laser 2.

The light is also coupled by the coupler 4 into a coupler 5 connected to coupler 4 and is send by coupler 5 into a fiber 9 being a DUT connected to coupler 5. Fiber 9 has a first end and a second end. The light is provided to the first end of fiber 9. At the second end of the fiber 9 the light is then reflected by an end reflex, e.g. a mirror 1, preferably a mirror 1 comprising a gold surface having a reflectivity of about 99%.

The light pulse reflected back by mirror 1 is then coupled back into coupler 5 and then a power $P_{reflected}$ of the reflected light pulse is measured by a detector 3 connected to coupler 5. The quotient of the power $P_{reflected}$ of the reflected light pulse to the input power P into fiber 9 multiplied by the reflectivity R of the mirror 1 is the two-way optical loss L of the fiber 9 according to the following formula:

$$L = P_{reflected} / (R*P)$$

Figure 2:
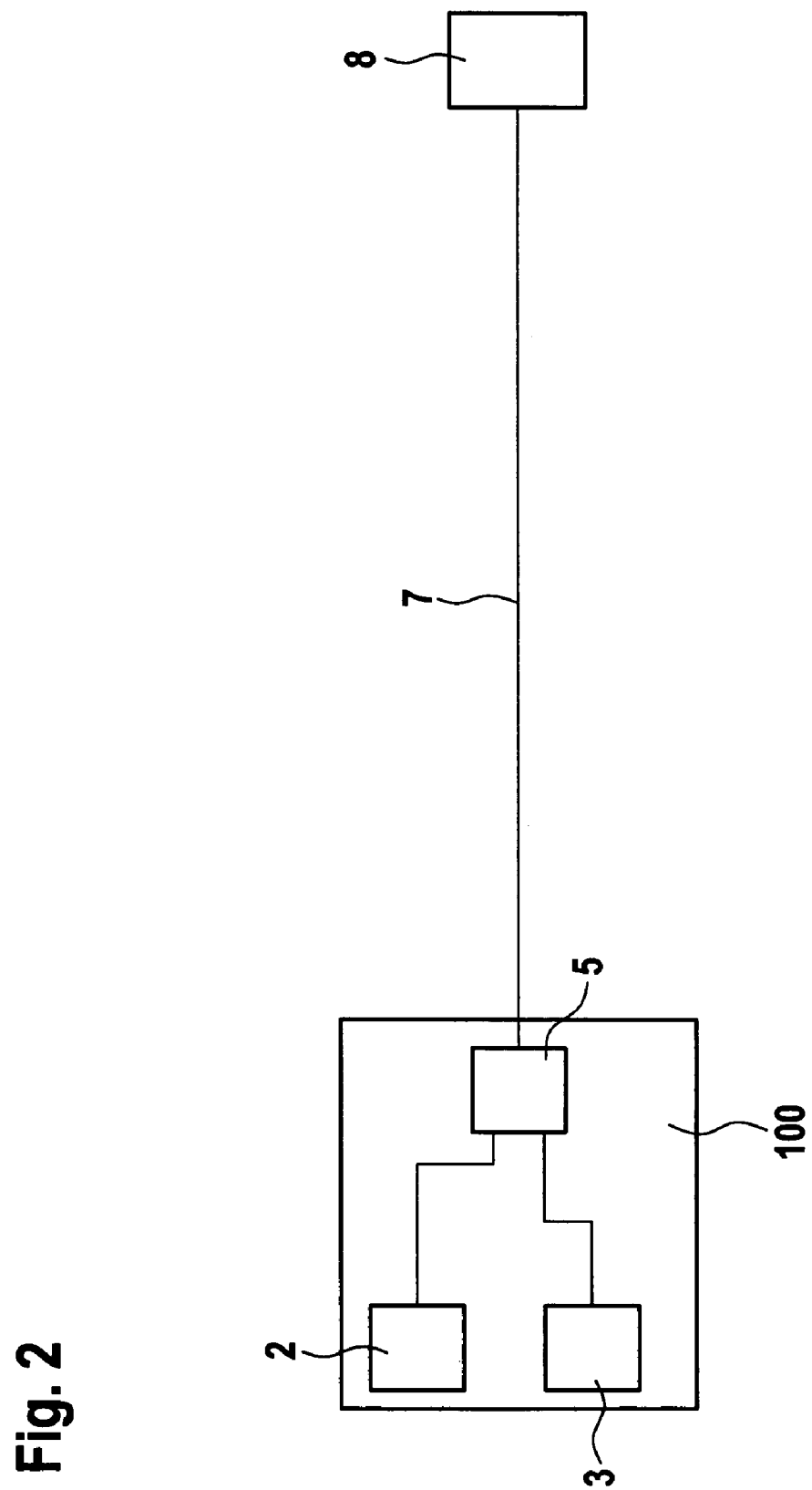

Another possible way of measuring the two-way optical loss from one end according to an embodiment of the present invention is shown in FIG. 2.

According to FIG. 2 the output power P of an OTDR 100 is calibrated using a lead-in fiber 7 connected to coupler 5 and to a reference reflex 8, e.g. of −45 dB. The reference reflex 8 can be but does not has to be the same as mirror 1. This calibration gives information about the power $P_{calibrated}$ of the light, which is present at the end, i.e. the lead-in point, of lead-in fiber 7 to be connected with the fiber 9 when performing the measurement.

Figure 3:
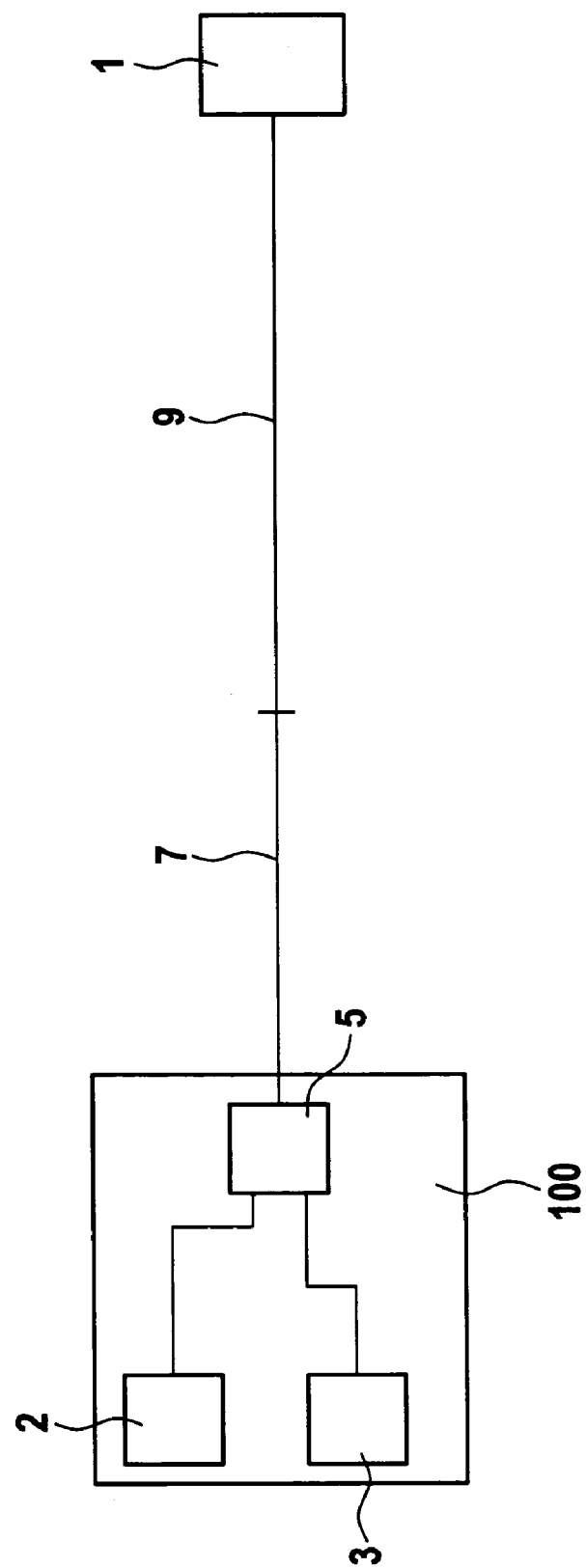

After having performed the calibration the first end of the fiber 9 is connected to the lead-in fiber 7 according to FIG. 3 and the measurement is taken as described above with respect to FIG. 1. However, P is replaced by $P_{calibrated}$, so that the formula reads:

$$L = P_{reflected} / (R*P_{calibrated})$$

Therefore, by using power $P_{calibrated}$ of the calibration step and power $P_{reflected}$ of the reflected light pulse reflected from end-reflex 1 the two-way optical loss of DUT 9 can be extracted.

Alternatively, the measurement of optical loss can also be done using an optical light source and an optical power meter replacing the OTDR. Then the power meter measures the power P of the light source and the reflected power $P_{reflected}$ of the reflected signal (not shown).

The invention claimed is:

1. A method utilizing an optical time domain reflector (OTDR) to measure an optical loss of a DUT having a first end and a second end, comprising the steps of:

coupling an optical signal into a first coupler, said first coupler coupling a first part of the optical signal towards the first end of the DUT and coupling a second part of the optical signal towards a first detector, determining the optical power of the optical signal on the base of measurement of the first detector, reflecting the first part of the optical signal at the second end of the DUT to send back a reflected optical signal into the DUT, receiving the reflected signal and an accumulated backscatter of the DUT at a second detector, determining a reflected optical power of the reflected optical signal by the second detector, wherein the OTDR includes at least the second detector, and evaluating a two-way optical loss on the basis of the determined optical power of the optical signal and the determined reflected optical power of the reflected optical signal.

2. The method of claim 1, further comprising the steps of:
reflecting the optical signal with a known reflectivity of the second end of the DUT, and
evaluating the two-way optical loss using the known reflectivity.

3. The method of claim 1, further comprising the steps of:
evaluating the two-way optical loss on the basis of the following formula:

$$L = P_{reflected}/(R*P),$$

L being the two-way optical loss, P being the determined optical power, $P_{reflected}$ being the reflected optical power, R being the reflectivity when reflecting the optical signal at the second end of the DUT.

4. The method of claim 1, further comprising the steps of:
coupling the first part of the optical signal received by the first coupler into a second coupler, said second coupler coupling said first part of the optical signal into the first end of the DUT and coupling the reflected optical signal into the second detector.

5. The method of claim 1, further comprising the steps of:
performing at least one of the above steps as a part of optical time domain reflectometry.

6. An apparatus utilizing an OTDR for measuring an optical loss of a DUT having a first end and a second end, comprising:
   a first coupler for coupling a first part of an optical signal towards the first end of the DUT, and a second part of the optical signal towards a first detector,
   a reflector connected to the second end of the DUT for reflecting the first part of the optical signal at the second end of the DUT to send back a reflected optical signal into the DUT,
   a second detector for receiving the reflected optical signal from the DUT and an accumulated backscatter of the DUT and for measuring a reflected optical power of the reflected optical signal, wherein the OTDR includes at least the second detector, and
   a computer connected to the first detector and the second detector for evaluating a two-way optical loss on the basis of the measurement results of these detectors.

7. The apparatus of claim 6,
wherein the reflector provides a known reflectivity for reflecting the optical signal, and the computer is designed to be able to use the reflectivity of the reflector when evaluating the two-way optical loss.

8. The apparatus of claim 6, further comprising:
a second coupler connected
to a first coupler for receiving the first part of the optical signal,
to the first end of the DUT for coupling the first part of the optical signal into the DUT and
to the second detector for coupling the reflected optical to the second detector.

9. The apparatus of claim 6,
wherein the reflector comprises a mirror.

10. The apparatus of claim 6,
wherein the reflector comprises a mirror which comprises a gold surface having a reflectivity of about 99%.

11. The apparatus of claim 6,
wherein at least one of the first coupler, the reflector, the first detector, the computer, the second detector, the second coupler being a part of an optical time domain reflectometer.

* * * * *